United States Patent
Bout

(10) Patent No.: US 12,344,048 B2
(45) Date of Patent: Jul. 1, 2025

(54) METHOD FOR IDENTIFYING PRESSURE SENSORS AND DEVICE FOR IMPLEMENTING SAID METHOD

(71) Applicant: ATEQ, Les Clayes sous Bois (FR)

(72) Inventor: Michel Bout, Shanghai (CN)

(73) Assignee: ATEQ, Les Clayes sous Bois (FR)

( * ) Notice: Subject to any disclaimer, the term of this patent is extended or adjusted under 35 U.S.C. 154(b) by 399 days.

(21) Appl. No.: 17/794,112

(22) PCT Filed: Dec. 17, 2020

(86) PCT No.: PCT/EP2020/086808
§ 371 (c)(1),
(2) Date: Jul. 20, 2022

(87) PCT Pub. No.: WO2021/148206
PCT Pub. Date: Jul. 29, 2021

(65) Prior Publication Data
US 2023/0050483 A1  Feb. 16, 2023

(30) Foreign Application Priority Data
Jan. 21, 2020 (FR) ..................... 2000572

(51) Int. Cl.
*B60C 23/04* (2006.01)
*G01L 17/00* (2006.01)
*G01S 5/02* (2010.01)

(52) U.S. Cl.
CPC ...... *B60C 23/0416* (2013.01); *B60C 23/0408* (2013.01); *B60C 23/0437* (2013.01); *B60C 23/0479* (2013.01); *G01L 17/00* (2013.01); *G01S 5/0269* (2020.05)

(58) Field of Classification Search
CPC ............ B60C 23/0416; B60C 23/0408; B60C 23/0437; B60C 23/0479; B60C 23/04; G01L 17/00; G01S 5/0269
USPC .................................................. 340/442–448
See application file for complete search history.

(56) References Cited

U.S. PATENT DOCUMENTS

| | | | |
|---|---|---|---|
| 8,149,100 B2 * | 4/2012 | Gila | B60C 23/045 340/447 |
| 9,050,862 B2 | 6/2015 | Mouchet | |
| 9,539,866 B2 | 1/2017 | Mouchet | |
| 10,875,365 B2 | 12/2020 | Mouchet et al. | |
| 11,279,183 B2 | 3/2022 | Bout | |

(Continued)

FOREIGN PATENT DOCUMENTS

| FR | 2826731 A1 | 1/2003 |
|---|---|---|
| WO | 2019243374 A1 | 12/2019 |

*Primary Examiner* — Brian Wilson
(74) *Attorney, Agent, or Firm* — Young Basile Hanlon & MacFarlane, P.C.

(57) ABSTRACT

A method and device for identifying pressure sensors of a tire pressure monitoring system (TPMS) of a motor vehicle. The method includes emission of a sensor activation signal, receiving of signals from at least two different sensors following activation, attenuation and amplification of the signals received, determination of a value indicative of the power of the signals received, and identification of the spatial position of at least one sensor on the basis of values indicative of the power of the signal received. A device configured as a TPMS tool is used for implementing the method.

10 Claims, 3 Drawing Sheets

(56) References Cited

U.S. PATENT DOCUMENTS

| | | |
|---|---|---|
| 2004/0178899 A1* | 9/2004 | Watanabe .......... B60C 23/0444 |
| | | 340/445 |
| 2013/0145834 A1 | 6/2013 | Mouchet |
| 2015/0054640 A1* | 2/2015 | Huang ............... B60C 23/0472 |
| | | 340/447 |
| 2019/0173528 A1* | 6/2019 | Keehr ..................... H04B 1/38 |
| 2021/0260936 A1 | 8/2021 | Bout et al. |
| 2021/0339583 A1 | 11/2021 | Regef |
| 2022/0144024 A1 | 5/2022 | Bout et al. |

* cited by examiner

METHOD FOR IDENTIFYING PRESSURE SENSORS AND DEVICE FOR IMPLEMENTING SAID METHOD

CROSS-REFERENCE TO RELATED APPLICATION(S)

This application is filed pursuant to 35 U.S.C. § 371 claiming priority benefit to PCT/EP2020/086808, filed Dec. 17, 2020, which claims priority benefit to France patent application no. FR2000572, filed Jan. 21, 2020, the entire contents of both applications incorporated herein by reference for all purposes.

TECHNICAL FIELD

The present invention relates to the field of sensors and in particular to a method for identifying said sensors making it possible to differentiate them and to locate them, as well as a device for implementing said method.

More particularly, the present invention advantageously applies to pressure sensors housed in tires of a motor vehicle, sensors generally associated with a computer of a motor vehicle to which said sensors transmit data.

BACKGROUND

The sensor/onboard computer assembly is thus designated by the term electronic "tire pressure monitoring system" (with the associated abbreviation "TPMS").

Each pressure sensor is conventionally equipped with a radio-frequency transmitter for transmitting data to the onboard computer. The onboard computer receiving the data from the sensors can thus alert the user of the vehicle if one of the tires were to burst or deflate, causing a risk for their safety.

However, the pressure sensor housed in the wheel is ordinarily not removable, and thus changing a wheel involves changing the sensor, and the new sensor is then no longer detected by the onboard computer of the vehicle.

It is therefore necessary, when changing tires, to pair (or associate) the sensors housed in the new tires with the onboard computer of the vehicle.

This pairing is done by means of a dedicated learning device (generally designated in English by the term "TPMS tool"), said device being configured for activating the sensors, recovering and recording the relevant data transmitted by the sensor, such as the identifier of the sensor, and transmitting them to the onboard computer, so that the latter detects and locates the sensors housed in the newly installed tires and can pick up the signals therefrom, in order to warn the user in the event of a pressure drop in one of said tires.

However, in some vehicles, such as heavy goods vehicles or buses, the wheels are mounted in pairs at each end of the axles, and it is then said that the wheels are twinned.

In twinned wheels, the two associated sensors are sometimes very close together, making it difficult to differentiate between the emissions coming from the sensors (both at rest and during the operation of the vehicle) without using encoding and identification techniques that are particularly complex and expensive.

For example, during learning, i.e. during the phase where the identifiers of the sensors are recovered to communicate them to the onboard computer of the vehicle, the sensors are sequentially activated in a predetermined order so that the onboard computer identifies and associates the sensors with each of the wheels of the vehicle. However, a simultaneous activation of several sensors may be done unintentionally when they are interrogated by the operator by means of his sensor activation device (such as the learning device). The operator can then not determine whether there is activation of the sensor housed in the outer wheel or activation of the sensor housed in the inner wheel.

The problem of simultaneous activation of several sensors is also encountered in factories, such as a tire manufacturing factory or a motor vehicle manufacturing factory, wherein it is necessary to activate the sensors to test them, to identify them and/or to pair them with the onboard computer of a vehicle. However, the manufacturing lines in the factories are often very close to each other, and an activation signal transmitted by an adapted device may cause the activation of a plurality of sensors, and hence the need to be able to identify or distinguish the activated sensors.

SUMMARY

The problems disclosed above have led to the design of a method for identifying sensors housed not only in twinned wheels, but also in separate wheels, as well as a device capable of implementing said method, such as a device for an electronic tire pressure monitoring system (TPMS) of a motor vehicle.

The invention is thus a novel method for identifying pressure sensors, in particular pressure sensors for an electronic tire pressure monitoring system of a motor vehicle, said sensors comprising at least one module for emitting and receiving data, said method comprising:
  emission of a sensor activation signal;
  receiving signals coming from at least two different sensors after they have been activated;
  attenuation and amplification of the signals received;
  determination of a value indicative of the power of the signal for each of the signals received;
  identification of the spatial position of at least one sensor on the basis of the values indicative of the power of said signals received.

As explained above, the method according to the invention makes it possible to identify or distinguish the sensors housed in twinned wheels or in environments including a plurality of sensors, this has the advantage of being simple to implement while being applicable in a great diversity of situations.

This is because the prior attenuation before amplification makes it possible to "filter" some of the parasitic signals, but especially to make it possible to more easily distinguish sensors that are very close to each other.

According to one possible feature, the value indicative of power of the signal is the gain value and/or the adaptation value of said signal. Each of the signals is for example characterised by a value indicative of the adaptation and/or the gain undergone by each of the signals following the attenuation and amplification thereof.

The value indicative of the power is an indicator making it possible to characterise the signals, this value may be the gain, the adaptation value, or a combination and/or function of these parameters, this on the basis of the situation of the sensors (immobile or a movement), and the environment thereof (parasitic signals, resonances, multiple reflections of the signals, etc.). The indicative value, such as the adaptation value, is for example dependent on the settings used by the receiver, these settings thus being an indication of the power of the signal.

According to another possible feature, the signal activating the sensors is transmitted at constant power.

It is thus unnecessary to provide a component for varying the emission power of the signals activating the sensors, and to have a power source sized accordingly. This has the consequence of simplifying the design of the device implementing said method and reducing the cost thereof.

According to another possible feature, the signals received undergo an identical attenuation.

According to another possible feature, there is reception or receiving of a plurality of signals coming from the same sensors.

Receiving a plurality of signals coming from the same sensor makes it possible to make the sensor identification process more robust, by opening up the possibility of applying a statistical processing to the samples collected. Receiving a plurality of signals also makes it possible to select the signal the power of which is the greatest (or the indicative value of which is the greatest) for each of the sensors.

Generally, signals coming from sensors are received during a predetermined period, in order to receive a plurality of signals from the same sensors.

Each signal transmitted by a sensor comprises an identifier particular to the sensor, enabling the signals received to be classified. According to another possible feature, there is selection of the signal having the value indicative of the power that is the highest for each of the sensors for said identification.

According to another possible feature, there is a comparison of the values indicative of the power of the plurality of signals received coming from at least a first and a second sensor, if all the values indicative of the power of the signals of one of the sensors is always less than or greater than all the values indicative of the power of the signals of the other sensor, then there is an identification of the spatial position of at least one of the sensors on the basis of the comparison of said values indicative of the power of the signals.

According to another possible feature, the signals received and/or the values indicative of the power of the signals coming from the same sensors are averaged and compared with each other, in order to identify the spatial position of at least one of the sensors.

According to another possible feature, the distribution of the values indicative of the power of the signals received is studied for each of the sensors, in order to determine a value indicative of the power that is the most characteristic possible for each of the sensors.

According to another possible feature, the extreme values indicative of power are eliminated to determine the value indicative of power that is the most characteristic possible for each of the sensors.

According to another possible feature, the attenuation level applied to the signals is variable, for example said level varies linearly over time and/or during a predetermined period of reception of a plurality of signals.

The present invention also relates to a device for activating sensors, in particular pressure sensors for an electronic tire pressure monitoring system of a motor vehicle, said device comprising:

at least one sensor activation means;
a means for receiving signals coming from the sensors;
an electronic entity configured for storing and/or processing information conveyed by the signals sent by said sensors;
a means for communicating with a remote electronic entity, such as the onboard computer of a motor vehicle, in order to transmit the information coming from the signals received;
characterised in that said reception or receiving means comprises:
an antenna for receiving the signals coming from the sensors;
an attenuator configured for attenuating the signals received,
an amplifier configured for amplifying the attenuated signals received;
each of the signals being characterised by a value indicative of power;
said electronic entity being configured for identifying the spatial position of at least one sensor on the basis of the values indicative of the power of the signals received.

According to a possible feature, the sensor activation device is a learning device for an electronic tire pressure monitoring system of a motor vehicle.

According to another possible feature, said sensors are pressure and/or temperature sensors housed in the tires of a motor vehicle.

According to another possible feature, each of the signals is characterised by a value indicative of the adaptation undergone by each of the signals following its attenuation and its amplification, the value indicative of the power of the signal being the adaptation value of said signal.

This method and this device are very inexpensive and particularly easy to implement. They also do not require any modification to existing technologies for communication between the learning devices and/or activation devices and the sensors.

BRIEF DESCRIPTION OF THE DRAWINGS

The invention will be better understood, and other aims, details, features and advantages thereof will appear more clearly in the course of the following description of particular embodiments of the invention, given solely by way of illustration and non-limitatively, with reference to the accompanying drawings, on which.

DETAILED DESCRIPTION

Figure 1:
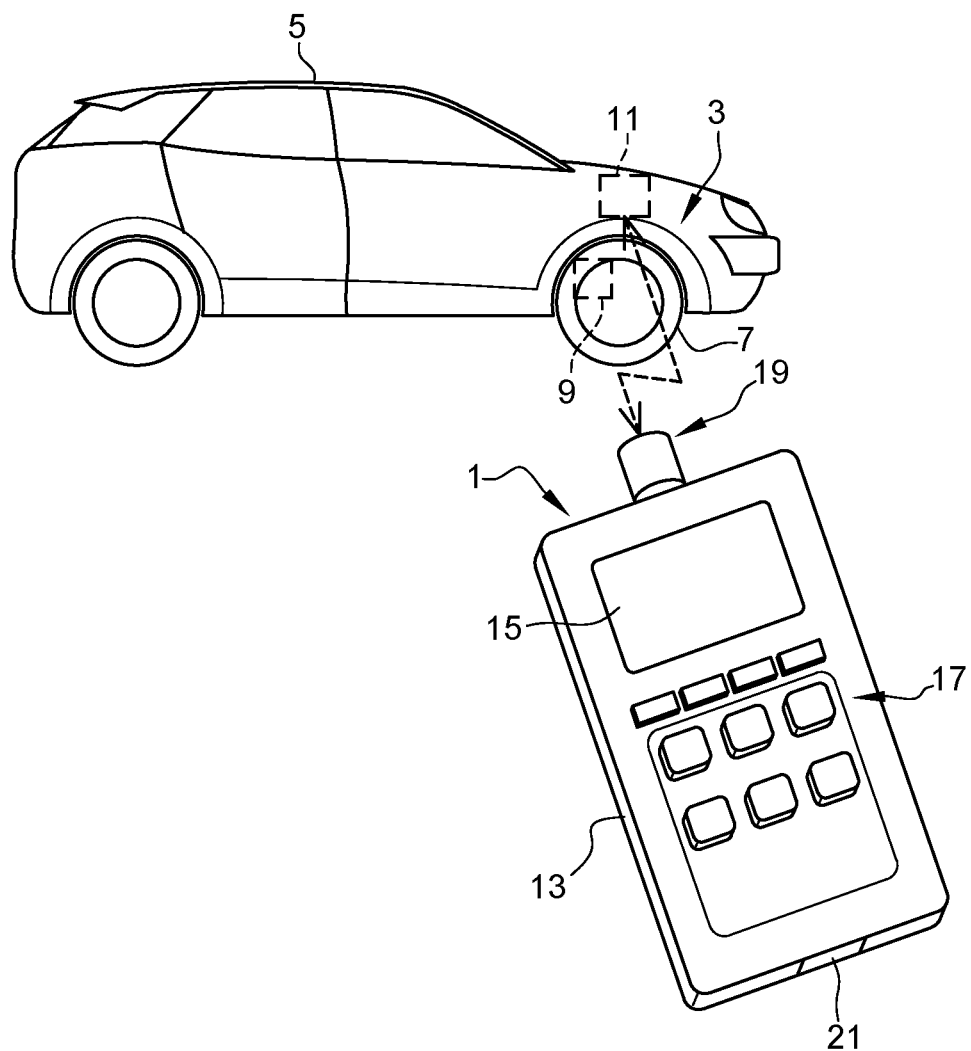
FIG. 1 is a schematic representation illustrating a sensor activation device according to the invention.

FIG. 1 is a highly schematic representation of a device 1 for activating sensors 9, more particularly in the present example the device 1 is configured as a learning device for an electronic tire pressure monitoring system 3 of a motor vehicle 5 (said device 1 also being able to be designated by the terms "valve activator" or "valve forcer").

The motor vehicle 5, firstly, is equipped with tires 7 wherein the sensors 9 are housed, such as pressure sensors, and secondly comprises an onboard computer 11 (also referred to as an electronic control unit and generally designated by the abbreviation "ECU").

The device 1 comprises a case 13, for example made from plastics material, a display device 15, a keypad 17 and an antenna 19 for transmitting a sensor activation signal, as well as an OBD (designating in English "onboard diagnostic") socket. Said OBD socket 21 is configured for enabling for example the device 1 to be connected to the onboard computer 11 of a vehicle, in particular by means of an OBD cable.

Figure 2:
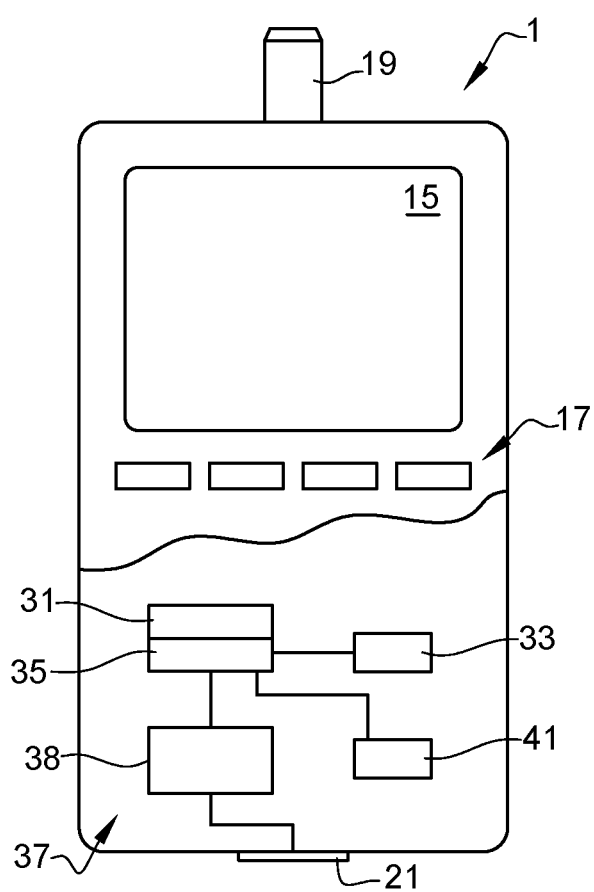
FIG. 2 is an enlarged view of the device of FIG. 1.

As for FIG. 2, this is an enlarged detail view of the device of FIG. 1.

Said device 1 thus comprises:

- at least one sensor activation means 31, such as means for generating sensor activation signals (continuous and/or modulated), said activation means 31 comprising the antenna 19 that makes it possible in particular to best propagate said generated signals to the sensors 9;
- a means 33 for receiving signals coming from the sensors, generally another antenna housed in the case 13 and configured for example for receiving signals in a frequency band between 300 and 500 MHz (the sensors 9 having at least one module for emitting and receiving data, the sensor 9 transmitting a signal after having been activated by said activation means 31);
  - an electronic entity 35 configured for storing and/or processing information conveyed by the signals transmitted by said sensors 9 (and received by means of the receiving means 33);
  - a means 37 for communicating with an onboard computer 11 of the motor vehicle 5 for transmitting the information from at least one of the sensors 9, information received by means of signals coming from said sensors 9.

The communication means 37 is for example an OBD module that comprises a circuit 38 for managing the OBD communication and the OBD socket 21 previously mentioned. It should be noted that the management circuit 38 may also be integrated in the electronic entity 35. The device 1 also comprises a battery 41 configured for supplying the various elements.

It should moreover be noted that said activation signals are electromagnet signals, continuous or modulated, transmitted by the activation means 31, which have for example a frequency of 125 kHz.

Figure 3:
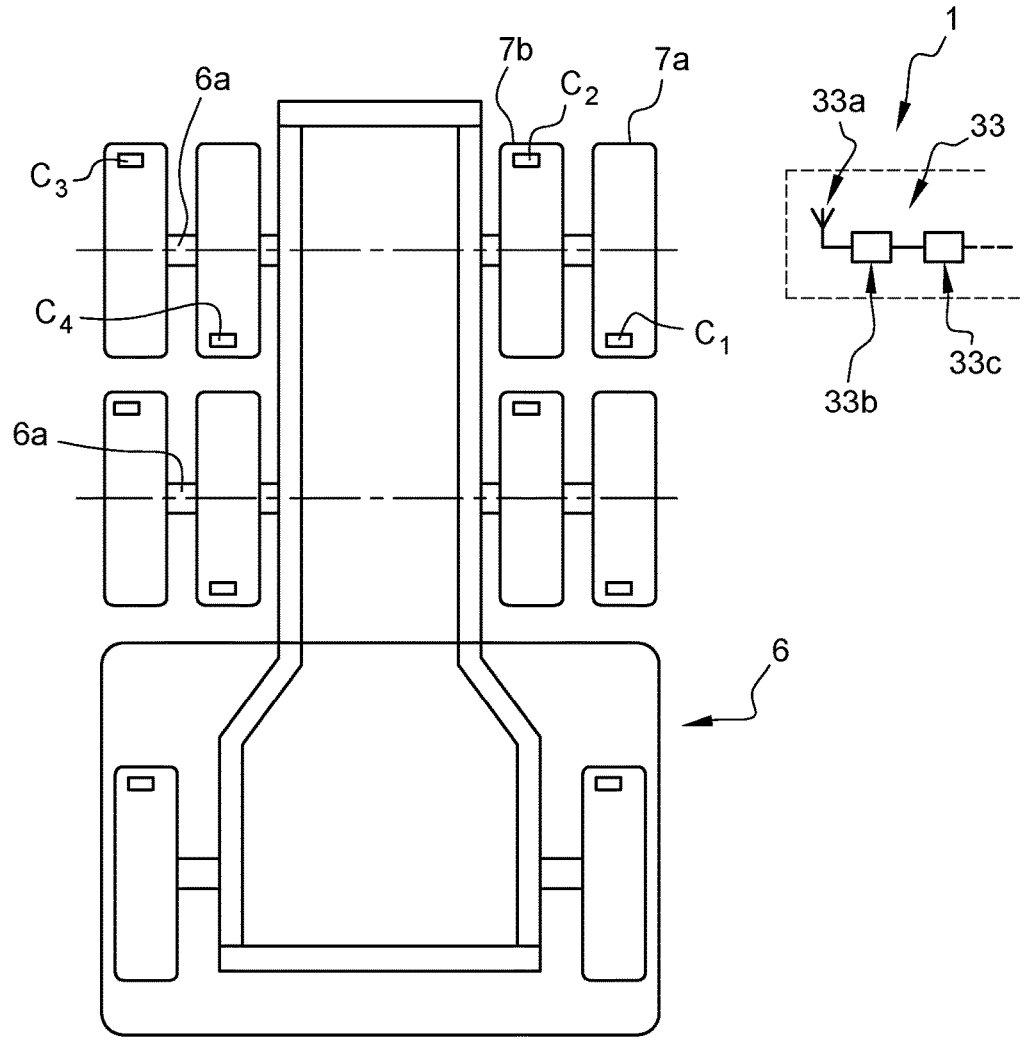
FIG. 3 is a highly schematic representation of the device of FIG. 1 during use thereof with one of the twinned wheels.

As illustrated in FIG. 3, said device 1 may also be usable with lorries 6 including twinned wheels, said device 1 may therefore be able to identify or differentiate the sensors 9 housed in these tires 7 (e.g., 7a and 7b shown in FIG. 3) disposed in proximity to each other. In the example illustrated in FIG. 3, the lorry 6 comprises a plurality of wheels the axles 6a of which comprising at their ends twinned wheels 7a and 7b in which sensors 9 respectively C1 and C2 are housed. The lorry may also comprise two other sensors C3 and C4 as illustrated on this FIG. 3.

More particularly, the receiving means 33 of the device 1 (means for receiving or reception the signals coming from the sensors) comprises at least three elements:

- a reception antenna 33a, said antenna being configured for receiving signals on the emission frequency of said sensors and transforming said electromagnetic signals into electrical signals;
- an attenuator 33b, which is for example an electronic circuit or component for reducing the amplitude of the signal received, i.e. in this case the electrical signal delivered by the antenna 33a;
- an amplifier 33c, which is for example an electronic circuit or component increasing the voltage and/or the intensity of the electrical signal, in the present case the electrical signal attenuated by the attenuator 33b.

The electrical signals, obtained by successive attenuation and amplification, are next processed by the electronic entity 35 (reading, decoding, characterisation, etc.).

Moreover, it should be noted that the attenuator 33b is for example adjustable for level, such as 0 dB, −6 dB, −12 dB and −18 dB, or is linearly variable between 0 dB and −18 dB.

As for the amplifier 33c, this is configured for automatically amplifying to the required level the signals received as an input so that the component located at the output of the amplifier (here the electronic entity 35) is able to process the amplified signal. This is because the electronic entity 35 (the receiver of the signal here) detects and processes only signals having a minimum amplitude and a signal to noise ratio having a certain threshold.

The amplifier 33c or third circuit therefore implements an automatic control of the gain (also designated by the acronym "AGC", standing for "automatic gain control"), affording automatic management of the amplification of the amplifier and avoiding saturation of the output and/or keeping the output level constant.

Thus said device 1 transmits an activation signal, for example in the direction of the sensors C1 and C2 housed in twinned wheels 7a and 7b of the lorry 6.

The sensors C1 and C2 are activated by the reception of the activation signal and said sensors C1 and C2 then transmit one or more signals in response.

Unfortunately, the activation signal transmitted by the device 1 may also activate one or more surrounding sensors 9, either other sensors 9 on the lorry 6, or sensors 9 housed in tires 7 of motor vehicles 5 located in the vicinity.

Moreover, the sensors 9 generally comprise a communication protocol limiting the collision of the signals transmitted by said sensors 9, and the consequence of this is in particular that the closest sensor (the one receiving the activation signal theoretically first) will not necessarily transmit first.

In addition, the sensors 9 housed in twinned wheels 7a, 7b are very close to each other and in an environment including obstacles that may cause multiple reflections, and this may have the consequence of varying the power of the signals transmitted by the sensors.

Afterwards, the device 1 receives the various signals transmitted by the sensors C1 and C2, preferably the device 1 is configured for receiving all the signals transmitted by the sensors 9 during a predetermined period. This predetermined period is variable, but advantageously sized so that the device 1 receives at least two signals coming from each of the sensors C1 and C2.

The attenuator 33b is configured for "strongly" attenuating the signals received by means of the antenna 33a, the attenuation is for example adjusted to attenuate the signals by −12 dB or −18 dB (respectively the power of the signals received is divided by 32 and 64).

This makes it possible to filter any parasitic signals, i.e. signals not coming from the sensors C1 and C2 or coming from multiple reflections (echo phenomenon).

Next the attenuator signals are amplified by the amplifier 33c.

The amplifier 33c is configured for amplifying the input signals to a certain amplitude (or power) level, the amplifier 33c will therefore automatically amplify the signals so that they have the same output amplitude and/or power. The output characteristics of said signals depend in particular on the electronic components (sensor etc.) downstream of the amplifier 33c and on their configuration (i.e. which characteristics the signals must have to be processed by said electronic components).

Thus, the signals transmitted by the sensors C1 and C2, having signals with variable powers, are attenuated identically and amplified at a fixed level (for example to obtain a given signal to noise ratio).

Each of the amplified signals can therefore be characterised by a gain G that is proportional to the power of the signal received and the attenuation applied by the attenuator 33b. The value of the gain G is therefore a value representing the power of the signal. This successive attenuation and amplification makes it possible to more easily distinguish two close-together sensors.

This is because, if two close-together sensors each transmit a signal A1 and B1 the difference in power of which is only 20%, the power of A1=1 and the power of B1=0.8; then an amplification, without prior attenuation, gives rise to small gain values for each of the signals and differences between the gains for each of the signals that are not necessarily sufficiently significant to be usable in identifying the relative spatial positions of the sensors with respect to each other.

For example, if the power of each of the signals must reach a value of 1.25, the gain GA1 applied to A1 is 1.25 while the gain GB1 applied to B1 is approximately 1.56; whereas, if each of the signals undergoes a prior attenuation of −12 dB, the power of the attenuated signals A1 and B1 is respectively approximately 0.0625 and 0.05 and their gain is respectively 20 and 25. It is thus found that a strong attenuation before amplification favours the identification of the sensors, on the basis of the fact that the power of the signal transmitted by the factor is proportional to its distance, the value of the gain of the signals makes it possible to determine the closest sensor (or the one furthest away).

It should be noted that, in the following example, the value representing the power of the signal is the value of the gain applied to the signal, but this may be other characteristic quantities or a function dependent on several parameters (such as the attenuation, the gain, etc.).

Figure 4:
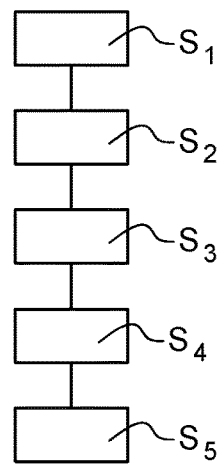
FIG. 4 is a logic diagram detailing steps of the sensor identification method according to the invention.

Thus the identification method used by the device 1, more particularly illustrated in FIG. 4, comprises at least the following steps:
emission S1 of a signal activating the sensors 9;
receiving S2 of signals coming from at least two different sensors 9 after they have been activated;
attenuation and amplification S3 of the received signals coming from said two sensors;
determination of a value indicative of the power of the signal (S4), such as the gain value G, for each of the signals received;
identification of the spatial position of at least one sensor S5 on the basis of the values indicative of the power of said received signals.

It should be noted that:
the signal activating the sensors is preferably transmitted at constant power and/or has a narrow emission cone;
the received signals undergo identical attenuation.

Moreover, the electronic entity 35 is configured for managing the duration of reception in order to receive a plurality of signals coming from the same sensors 9.

In addition, as each signal transmitted by a sensor 9 comprises an identifier particular to the sensor, the electronic entity 35 can classify the received signals on the basis of their origin (i.e. from the sensor that transmitted said signal). Receiving a plurality of signals for the same sensor can for example make it possible to select the signal having the greatest gain value G (or a value indicative of power) in order next to proceed with a comparison and the identification of the relative spatial positions between two sensors.

Thus, in parallel with the receiving of said signals, the electronic entity 35 compares in pairs the value indicative of the power of the received signals, and makes it possible to check that the value indicative of the power of the signals transmitted by a sensor 9 is always less than or greater than the signals transmitted by other sensors 9. If this is the case there is identification of the relative spatial position of at least one of the sensors 9 that transmitted a signal.

This supplementary operation increases the chances of correctly identifying the spatial position of a sensor 9.

However, in order to further improve the identification of the sensors 9, it is possible for example to study the distribution, by sensor, of the values indicative of the power of the received signals, in order to determine a power value that is the most indicative possible of a signal for each of the sensors 9.

The values of the signals by sensors 9 are for example categorised by interval of values, also designated by the term class in mathematics, i.e. the extreme values make it possible to delimit classes in which the values are distributed. It should be noted that it is possible to define classes having or not the same amplitude (the amplitude being the interval of values defining each class).

Next there is a determination of the number of values per class and selection of the class including the largest number of values (the latter is also designated by the term "modal class").

The interval comprising the most values is then considered to be the most probable and it is possible to take an average of the values included in this interval to determine a value indicative of the power of the signal that is the most characteristic possible for each of the sensors 9, the characteristic values per sensor next being compared with each other to determine the sensor 9 closest to (or furthest away from) the receiving means 33).

It should be noted that, whatever the method used, this can be generalised to n sensors 9, comparing and classifying values indicative of power making it possible to determine the relative spatial positions of the sensors, with respect to each other, from which the signals were received.

In an embodiment that is not shown, the attenuation level, generated by the attenuator 33b, applied to the signals varies linearly, for example over time. In that case, the value indicative of the power of the signal is rather a value that is a function of the gain and of the attenuation, such as a signal adaptation value.

The linear variation in the attenuation makes it possible moreover to reveal transient phenomena that may influence the signals received and to eliminate them, in order to improve the identification of the sensors 9.

The invention claimed is:

1. A method for identifying pressure sensors for an electronic tire pressure monitoring system of a motor vehicle, said pressure sensors (9, C1, C2, C3, C4) comprising at least one module for emitting and receiving data, said method comprising:
emission (S1) of a sensor activation signal;
receiving (S2) of a signal coming from each of at least two different pressure sensors positioned in close proximity to one another after the at least two different pressure sensors have been activated;
attenuation and amplification (S3) of each of the signals received in order to distinguish the signals from each of the at least two different pressure sensors;
determination (S4) of a value indicative of a power of the signal for each of the at least two different pressure sensor signals received, wherein the value indicative of the power of each signal is at least one of a gain value (G) or an adaptation value of said each signal; and identification (S5) of a spatial position of at least one pressure sensor of the at least two different pressure sensors on the basis of the determined values indicative of the power of said signals received.

2. The method according to claim 1, characterised in that the sensor activation signal activating the pressure sensors (9, C1, C2, C3, C4) is transmitted at constant power.

3. The method according to claim 2, characterised in that the signals received undergo an identical attenuation.

4. The method according to claim 1, wherein the receiving of signals from the at least two different pressure sensors comprises receiving of a plurality of signals coming from each of the at least two different pressure sensors (9, C1, C2, C3, C4).

5. The method according to claim 4, further comprising selecting the signal having the value indicative of power that is the highest for each of the at least two different pressure sensors (9, C1, C2, C3, C4) for said identification.

6. The method according to claim 5, wherein the at least two different pressure sensors comprise at least a first pressure sensor (9, C1) and a second pressure sensor (9, C2), the method further comprising comparing of the values indicative of the power of the plurality of the signals received coming from the first pressure sensor (9, C1) and the second pressure sensor (9, C2), wherein if all the values indicative of the power of the plurality of signals of one of the first pressure sensor or the second pressure sensor is always less than or greater than all the values indicative of the power of the plurality of signals of the other of the first pressure sensor or the second pressure sensor (9, C1, C2), then there is identification of the spatial position of at least one of the first pressure sensor or the second pressure sensor.

7. The method according to claim 1, wherein a level of the attenuation applied to the signals received is variable.

8. A device (1) for activating at least two pressure sensors positioned in close proximity to one another (9, C1, C2, C3, C4) for an electronic tire pressure monitoring system on a motor vehicle, said device comprising:
   at least one sensor activation means (31);
   a means (33) for receiving signals coming from the at least two pressure sensors;
   an electronic entity (35) configured for at least one of storing or processing information conveyed by the signals received sent by said at least two pressure sensors (9);
   a means for communicating (37) with a remote electronic entity of the motor vehicle, in order to transmit the information conveyed by the signals received; characterised in that said receiving means (33) comprises:
      an antenna (33a) for receiving the signals coming from the at least two pressure sensors (9, C1, C2, C3, C4);
      an attenuator (33b) configured for attenuating the signals received;
      an amplifier (33c) configured for amplifying the attenuated signals received, the attenuator and amplifier configured to distinguish the signals from each of the at least two pressure sensors from one another;
   wherein following amplifying the attenuated signals received each of the signals being characterised by a value indicative of power (G); and
   wherein said electronic entity (35) being configured for identifying a spatial position of at least one of the at least two pressure sensors (9, C1, C2, C3, C4) on the basis of the values indicative of the power of the signals received.

9. The device according to claim 8, characterised in that each of the signals is characterised by a value indicative of an adaptation undergone by each of the signals following the attenuation and amplification thereof, the value indicative of the power of the signal being the adaptation value of said signal.

10. The device according to claim 8, wherein the remote electronic entity comprises an onboard computer (11) of the motor vehicle.

* * * * *